(12) United States Patent
Thingbo et al.

(10) Patent No.: US 7,060,967 B2
(45) Date of Patent: Jun. 13, 2006

(54) OPTICAL WAVELENGTH INTERROGATOR

(75) Inventors: Dag Thingbo, Vikhammer (NO); Jon Thomas Kringlebotn, Trondheim (NO); Hilde Nakstad, Trondheim (NO); Erlend Ronnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 26 days.

(21) Appl. No.: 10/963,081

(22) Filed: Oct. 12, 2004

(65) Prior Publication Data

US 2006/0076476 A1   Apr. 13, 2006

(51) Int. Cl.
   *G01J 1/04* (2006.01)
   *G02B 6/26* (2006.01)
(52) U.S. Cl. .................... 250/227.18; 250/227.14; 250/227.23; 356/478; 385/12
(58) Field of Classification Search ........... 250/227.14, 250/227.18, 227.23; 356/478; 385/12
   See application file for complete search history.

(56) References Cited

U.S. PATENT DOCUMENTS 6,097,487 A * 8/2000 Kringlebotn et al. ....... 356/450

* cited by examiner

*Primary Examiner*—Kevin Pyo
(74) *Attorney, Agent, or Firm*—Patterson & Sheridan, L.L.P.

(57) ABSTRACT

An optical wavelength readout system for application in optical sensing systems is disclosed. The system includes a Master unit including a wavelength swept optical source for launching light into a string of optical sensors, and a detection and processing unit for detecting and processing the light emitted by the source. The system also includes a Slave unit including a light coupling device for coupling light from the light source into the string of sensors and for coupling light reflected from the string of sensors to a detection and processing unit arranged to detect and process the reflected light. The Master unit includes a wavelength reference unit adapted to make a reference signal available to other parts of the sensing system. The reference signal represents a generally exact relation between the wavelength of the light emitted from the source and time.

24 Claims, 5 Drawing Sheets

OPTICAL WAVELENGTH INTERROGATOR

BACKGROUND OF THE INVENTION

1. Field of the Invention

Embodiments of the invention generally relate to optical sensor systems. More particularly, embodiments of the invention relate to an optical wavelength interrogator to be used for interrogating fiber Bragg grating (FBG) sensors.

2. Description of the Related Art

Fiber Bragg gratings (FBGs), through measurements of Bragg wavelengths, can be used to detect any perturbations, such as temperature or strain (at the locations of the FBGs), which change the physical period of the refractive index modulation and/or the effective refractive index seen by the propagating light along the FBG, and hence the Bragg wavelength. These FBG sensors can be multiplexed along one or several fibers by writing the FBGs at different wavelengths that do not overlap under sensor operation.

One or several reflected FBG sensor wavelengths can be measured using a broadband source provided the source spectrum covers all possible FBG sensor wavelengths. These techniques for measuring FBG sensor wavelengths using a broadband source enable simultaneous wavelength demultiplexing and demodulation (wavelength determination) of the various FBG sensors. The transmission wavelength of the tuneable filter (or the laser source) will normally be scanned over the complete wavelength range of the sensors, where the control voltages to the tuning element, or the scan times, corresponding to maxima in the detected power are measures of the sensor Bragg wavelengths. The relationship between the control voltage, or scan time, and the tuning wavelength, i.e., the filter response, will for practical tuning elements not be linear, and will suffer from drift and hysteresis in the filter response. This is particularly true for a PZT-driven tuning element. For these reasons, some sort of reference scheme is required to measure Bragg wavelengths with high accuracy and repeatability.

One method for providing the reference scheme includes using a reference grating of known Bragg wavelengths arranged at the start of each of the series of FBGs. However, this means that the wavelength band of the reference FBG of each interrogator is dedicated to the reference FBG and is not available for use by a sensor FBG. Accordingly, use of the reference grating at the start of each series of FBGs limits and restricts the available optical bandwidth for the sensor FBGs.

A reference element in the form of a gas absorption cell has been shown in U.S. Pat. No. 6,421,120 ("the '120 patent"). The '120 patent describes an optical wavelength apparatus with a wide wavelength range which is illuminated by a wideband source. Suitable secondary devices including etalons, such as Fabry-Perot filters and Mach-Zehnder interferometers, are also described as wavelength reference elements. An absorption line in the gas absorption cell is used as a transfer standard to calibrate the response of a secondary reference over the range of a first reference.

Further, U.S. Pat. No. 6,587,484 ("the '484 patent") describes a method and apparatus for determining a transmission wavelength for lasers in a dense wavelength division multiplexer. The apparatus of the '484 patent includes both a gas reference cell and an etalon being used to calibrate a transmission laser in a dense wavelength division multiplexer (DWDM) system.

In FBG sensing networks the amplitudes of the signals reflected from the FBG sensors may differ significantly between each sensor. The dynamic range of the receiver may then in many situations be too low to be able to measure the FBG sensors having small amplitudes of the corresponding reflection signals at the detection end (i.e., large losses). Hence, it is not possible to choose an optimum receiver sensitivity which covers all sensors. A receiver sensitivity sufficiently high to measure reflected signals of low amplitude can saturate the detectors for strong signal reflections from the FBGs.

Therefore, a need exists to have an FBG sensing network with a higher total dynamic range at the receiver end. A further need exists for an FBG sensing network with improved optical bandwidth for the sensor FBGs.

SUMMARY OF THE INVENTION

Embodiments of the invention generally relate to an optical wavelength readout system for application in optical sensing systems. The system includes a Master unit including a wavelength swept optical source for launching light into a string of optical sensors, and a detection and processing unit for detecting and processing the light emitted by the source. The system also includes a Slave unit including a light coupling device for coupling light from the light source into the string of sensors and for coupling light reflected from the string of sensors to a detection and processing unit arranged to detect and process the reflected light. The Master unit includes a wavelength reference unit adapted to make a reference signal available to other parts of the sensing system. The reference signal represents a generally exact relation between the wavelength of the light emitted from the source and time.

BRIEF DESCRIPTION OF THE DRAWINGS

The technical features and the advantages of the invention will become apparent from the detailed description below and the accompanying drawings.

DETAILED DESCRIPTION

Embodiments of the invention generally relate to a wavelength interrogation or readout system based on a Master-Slave configuration having a Master unit ("Master") and one or more Slave units ("Slave(s)") arranged separately from the Master unit. The Master includes a wavelength swept light source in combination with a wavelength reference system, which can be a reference fiber Bragg grating, an interference filter with fixed free spectral range (such as a Fabry-Perot etalon), or a gas absorption cell or any combination of these elements, and a Master detection/processing unit.

Figure 1:
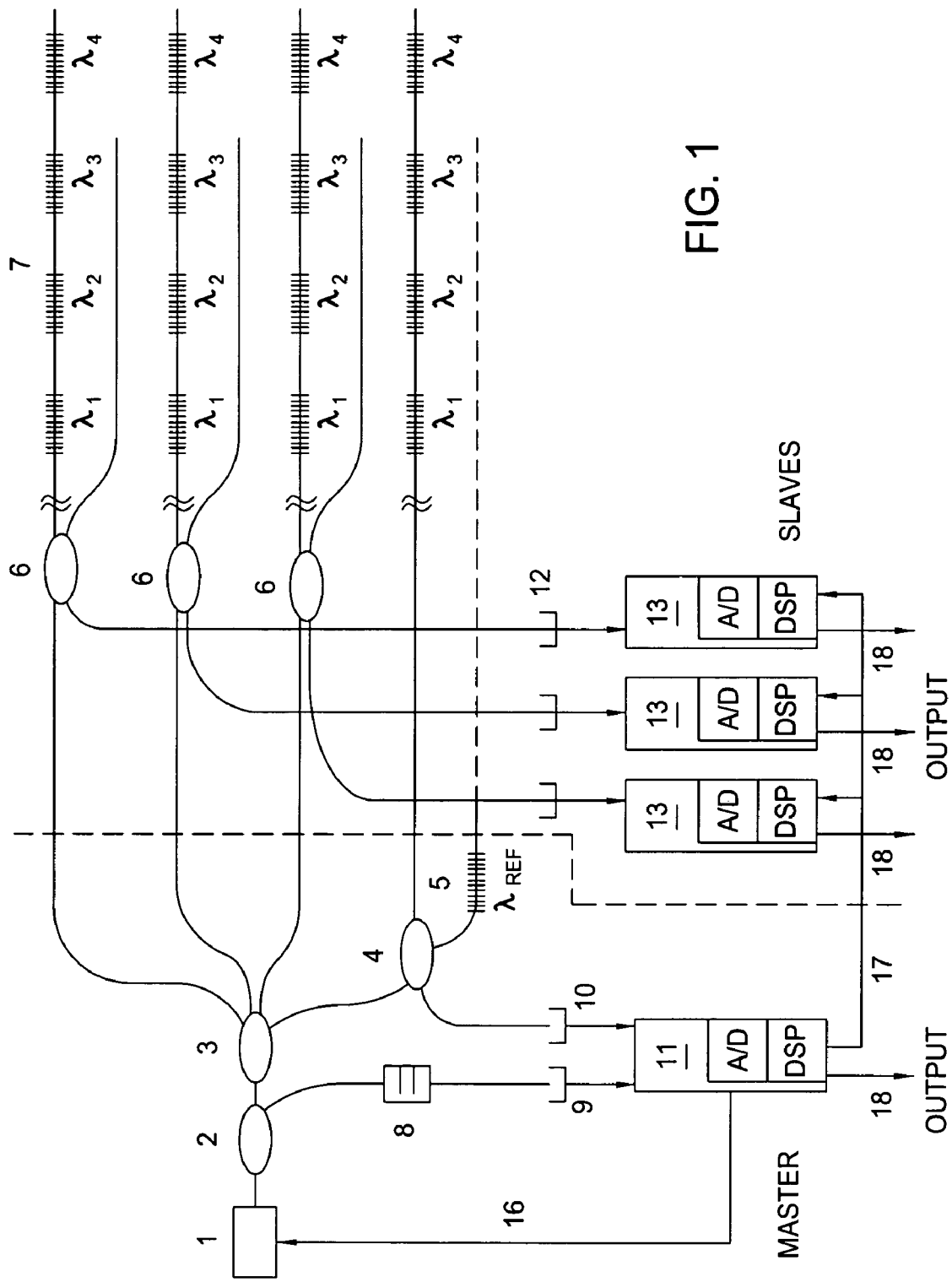
FIG. 1 shows one embodiment of a Master-Slave fiber Bragg grating (FBG) interrogator illustrating optical reference elements of a Master unit and a Slave unit that includes optical couplers.

FIG. 1 shows a wavelength readout system according to an embodiment of the invention. An optical coupler 2 is arranged to couple a part of the light from an optical source 1 to a string of FBG sensors/elements 7 and to couple light reflected from the FBG sensors to detection units or receivers 12 of the Slave(s). Another part of the light from the source 1 is coupled by the coupler 2 to a branch leading this part of the light to a source signal detection unit 9 of the Master.

Figure 2:
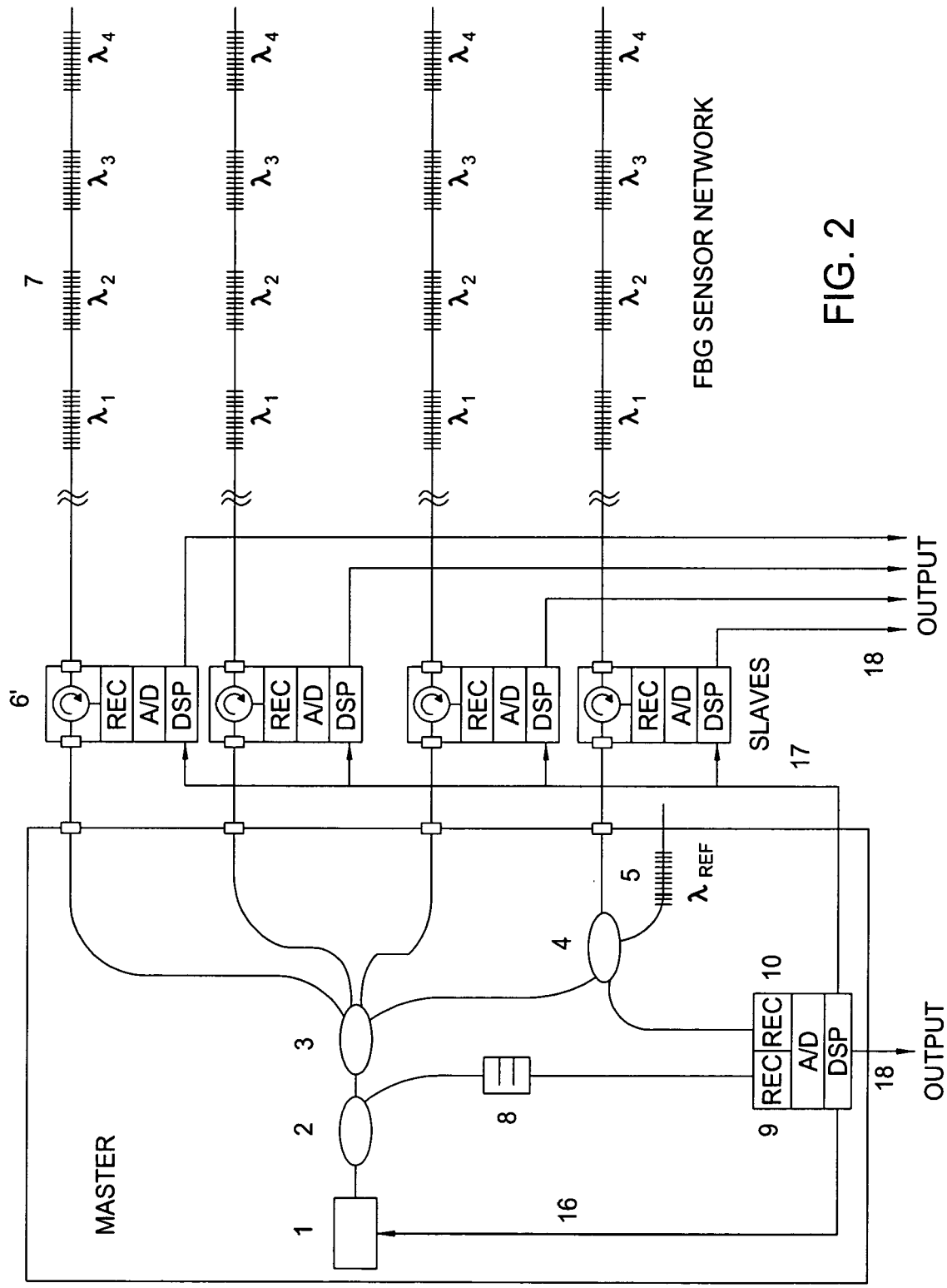
FIG. 2 shows another embodiment of a Master-Slave FBG interrogator which is similar to the one in FIG. 1, but the couplers in the Slave unit are replaced by optical circulators.

Between the coupler 2 and the source signal detection unit 9 or receiver of the Master, the light can be made to pass through a fixed cavity length interference filter 8 or a reference element, which can be either a reference fiber Bragg grating, an etalon, or a gas absorption cell or any combination of these elements (in FIG. 2 the reference element is preferentially an etalon).

The light to the string of FBG sensors/elements 7 can be divided between a number of strings coupled in parallel by a 1×N splitter 3. An output branch of the 1×N splitter 3 directs a part of the light to a reference FBG element 5, i.e., an FBG of known characteristics held at relatively constant conditions. The light reflected from the reference FBG 5 is returned through a coupler 4 to a reference detector 10 of the Master unit.

The abovementioned fixed cavity length interference filter 8 forms a wavelength reference system. The reference FBG element 5 can also be a part of such a wavelength reference system.

The light from the source 1 that provides wavelength swept broadband light is thus split between several strings of FBG sensors/elements such as the string of FBG sensors/elements 7 by the 1×N splitter 3, and passed through a coupler 6, or alternatively a circulator 6' (as shown in FIG. 2) to reduce the loss at the beginning of each string. The reflected signals from the strings of FBG sensors return through the coupler 6 or circulator 6' and couple to the individual receivers 12 and individual slave processing units 13 for each FBG sensor string. In addition, a sensor string such as the string of FBG sensors/elements 7 can be allocated to the Master. Each Slave consists of the receiver 12, the coupling device (e.g., the coupler 6 or circulator 6'), and the individual slave processing unit 13. Each receiver 12 includes an optical detector and can also include an electrical amplifier and an electric/electronic filter.

In one alternative, the optical source 1 is a broadband light source combined with a wavelength swept optical filter, typically a tunable Fabry-Perot filter. In another alternative, the optical source 1 is a wavelength swept laser, e.g., a fiber ring laser or a tunable semiconductor laser. In yet another alternative, the optical source 1 can be a superluminescent light emitting diode (SLED) or a super-fluorescent rare-earth doped fiber source.

The master is arranged to detect with the source signal detection unit 9 a part of the light from the source 1 that is split off by the coupler 2 and passed through the fixed cavity length interference filter 8 before falling on the source signal detection unit 9.

One of the output branches of the 1×N coupler 3 is coupled to the coupler 4 which splits the light between a branch with an FBG sensor string and a branch with the reference FBG 5. Light reflected from the reference FBG 5 returns through the coupler 4 and is partly coupled into a branch with the reference detector 10, which is coupled to the Master.

In a preferred embodiment, the wavelength reference system in the Master unit of the invention comprises the fixed cavity length interference filter 8, typically a Fabry-Perot filter (an etalon), to provide a reference frequency comb spectrum in combination with at least one reference FBG such as the reference FBG 5 for absolute wavelength referencing, as disclosed in U.S. Pat. No. 6,097,487 which is hereby incorporated by reference. Alternatively, a reference interference filter without a reference FBG, for example using the source envelope to identify one or more reference peaks in the comb spectrum for absolute wavelength referencing, can be used as disclosed in U.S. patent application Ser. No. 10/745,291, filed Dec. 23, 2003, hereby incorporated by reference. Another embodiment of the reference system includes one or more gas absorption cells for absolute wavelength referencing. This could be in combination with a fixed cavity length interference filter, as described in U.S. Pat. No. 6,421,120 B1, and U.S. Pat. No. 6,587,484 B1.

The Master provides a control output signal to a feedback arrangement 16 from the Master to the optical source 1 for controlling the optical wavelength of the source 1 (i.e., the sweep start, speed and range) that is wavelength swept. The time varying detector signals, both the reference signals in the Master and the reflected sensor signals in the Master and the Slaves, i.e., pulse trains with each pulse representing the individual grating spectra, are electronically amplified and filtered, sampled by analog-to-digital (A/D) converters and processed using filtering and peak detection algorithms in digital signal processors (DSPs) to provide exact time information about the time and amplitude of the reference and sensor peaks.

The reference signals are used together with calibration information about the reference peak wavelengths to provide a complete wavelength reference scale, i.e., exact wavelength of sweep source verses time. This wavelength reference scale is transferred from the DSP of a processing unit 11 of the Master to the DSPs of each individual slave processing unit 13 using a communication arrangement 17 to provide the required reference for the detected sensor signals in the Slaves.

In the drawings accompanying this description, the feedback arrangement 16 is illustrated as a connection between the Master and the source 1. However, the feedback arrangement 16 could equally well comprise a connection between a Slave unit and the source 1.

A crystal oscillator in the Master unit provides a clock (e.g., 16 MHz) signal which is a reference for the clocks in the AD converter and DSP of the Master. The A/D converters and DSPs in the Slaves are synchronized with the A/D converter and DSP of the Master (within +/−1 DSP clock cycle (e.g., 32 ns)) to make sure that the detected sensor spectra in the Slaves are sampled simultaneously with the sensor/reference spectra in the Master.

The Master unit can also be adapted to provide a reference signal to the other parts of the readout system, where the reference signal can contain information on the intensity of the light emitted by the optical source 1.

The communication arrangement 17 for transferring the reference signals from the Master to the Slave(s) can be provided by an electrical output by the Master to an electric communications connection or link between the Master and the Slave(s).

There will be a small delay between equidistant samples in the Master and the Slaves. This delay is measured using a synchronization pulse from the Master DSP which is transmitted to the Slave DSPs on a separate line and detected to provide individual delay correction factors for each Slave. The Master can also be used to measure the reflected wavelengths from FBG sensors connected to the Master (see FIG. 1). The sensor signals are processed and presented simultaneously in the Master and all the Slaves.

The slave processing unit 13 is adapted to determine a wavelength peak in the spectrum of the detected signal which mainly is light reflected from the FBG sensors/elements. The slave processing unit 13 can use the reference signal obtained from the Master and its corresponding processing unit 11. In a Master with the reference FBG 5, the wavelengths of sensors must not overlap with the wavelength of the reference FBG 5. However, the Slaves do not have any reference FBGs and have no such restrictions on the sensor FBG wavelengths.

Both the Master and the Slaves provide individual electrical outputs 18 with processed data such as sensor and reference peak wavelengths and amplitudes, including comb spectrum peak amplitudes. The data outputs are typically transmitted over individual data links (e.g., RS 232) to a PC (not illustrated), where the data can be stored, further processed and presented.

As mentioned above, the reference signal contains information about the wavelength verses time of the swept light. The reference signal can be used to provide feedback to the actuator which provides the tuning of the light, and hence be used to control the tuning speed during the sweep. The reference signal can also be used to linearize the sweep, which normally will be non-linear due to non-linear response of the actuator, providing time equidistant combs in the comb spectrum. This can be beneficial for the wavelength measurement accuracy and repeatability. Also, the reference signal can provide information on the amplitude verses time of the swept light using the peak amplitudes of the reference comb spectrum. This information can also be fed back to the source 1 that is swept light to equalize the output power verses time of the swept light by either controlling the drive current of the source or by controlling an external modulator or variable optical attenuator. This can reduce variations in reflected signal amplitudes and hence increase the dynamic range of the system. It is also possible to use the amplitudes of the sensor signals to vary the output power verses time such that all reflected sensor signal amplitudes are equalized.

It is an important advantageous feature of the Master/Slave system as described for interrogation of FBG sensors along one or more fibers that the Master contains the wavelength swept source and all the optical components of the wavelength reference system.

FIG. 2 shows an alternative embodiment of the wavelength readout system which is similar to the embodiment of FIG. 1, but where the couplers 6 are replaced by optical circulators 6'. This reduces total losses in the system but restricts the number of outputs per slave to one. Further, the schematic diagram of FIG. 2 is intended to illustrate more clearly which parts belong to the Master and which parts belong to the Slaves. The optical detectors are denoted REC. The detectors REC are coupled to analog-to-digital converters (A/D), whose outputs are coupled to digital signal processors (DSP).

Figure 3:
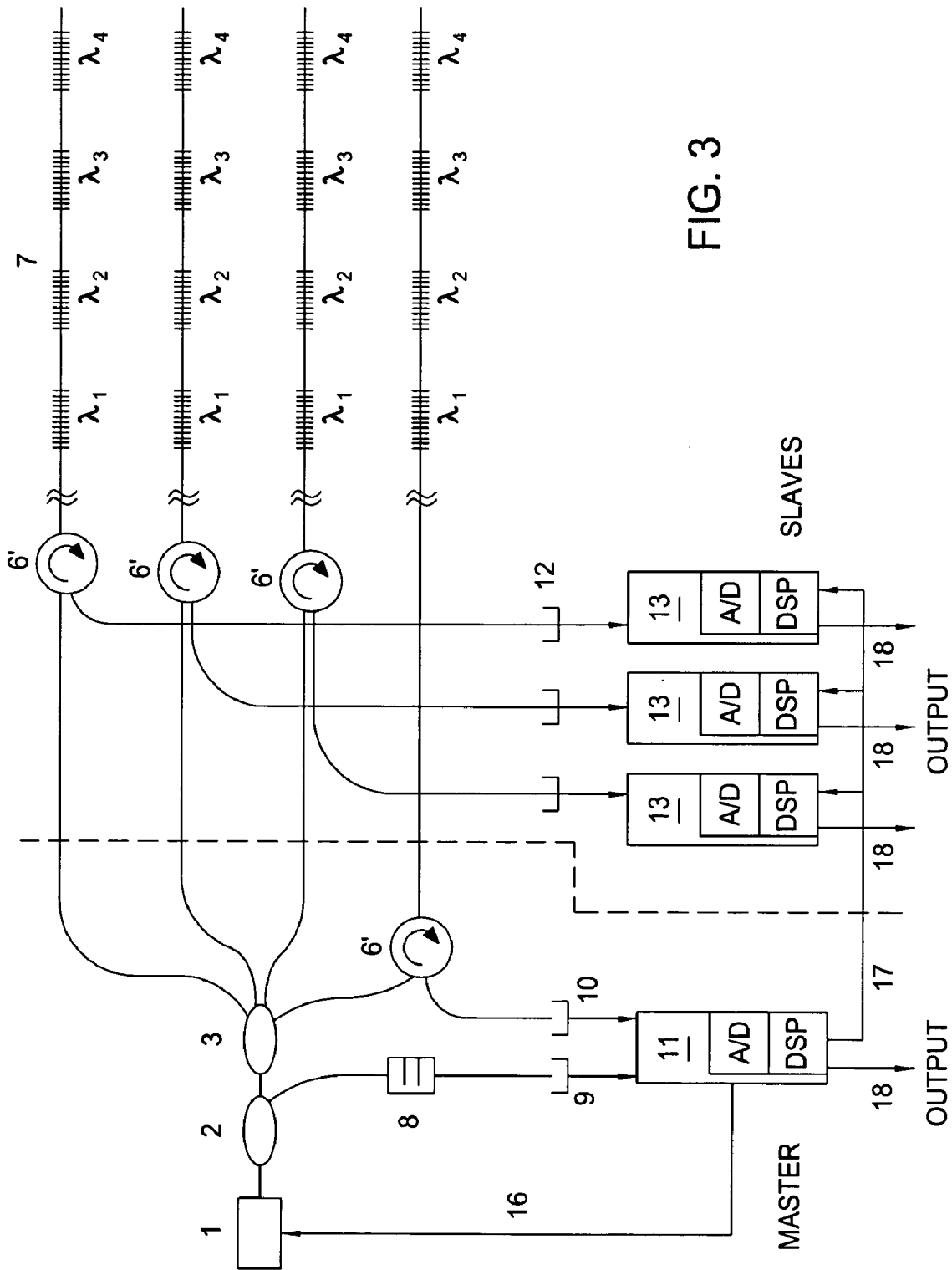
FIG. 3 is a schematic of a Master-Slave FBG interrogator without a reference grating, and using circulators in the Slave/Master units.

FIG. 3 illustrates schematically an alternative embodiment of a wavelength interrogator without an FBG reference sensor. In this embodiment, the optical reference is generated only by a fixed cavity length interference filter 8 such as an etalon. When the output of a source 1 that is wavelength swept is passed through the etalon, an output signal is generated which represents the transmission spectrum of the etalon. This etalon spectrum has a comb shaped form.

Figure 4:
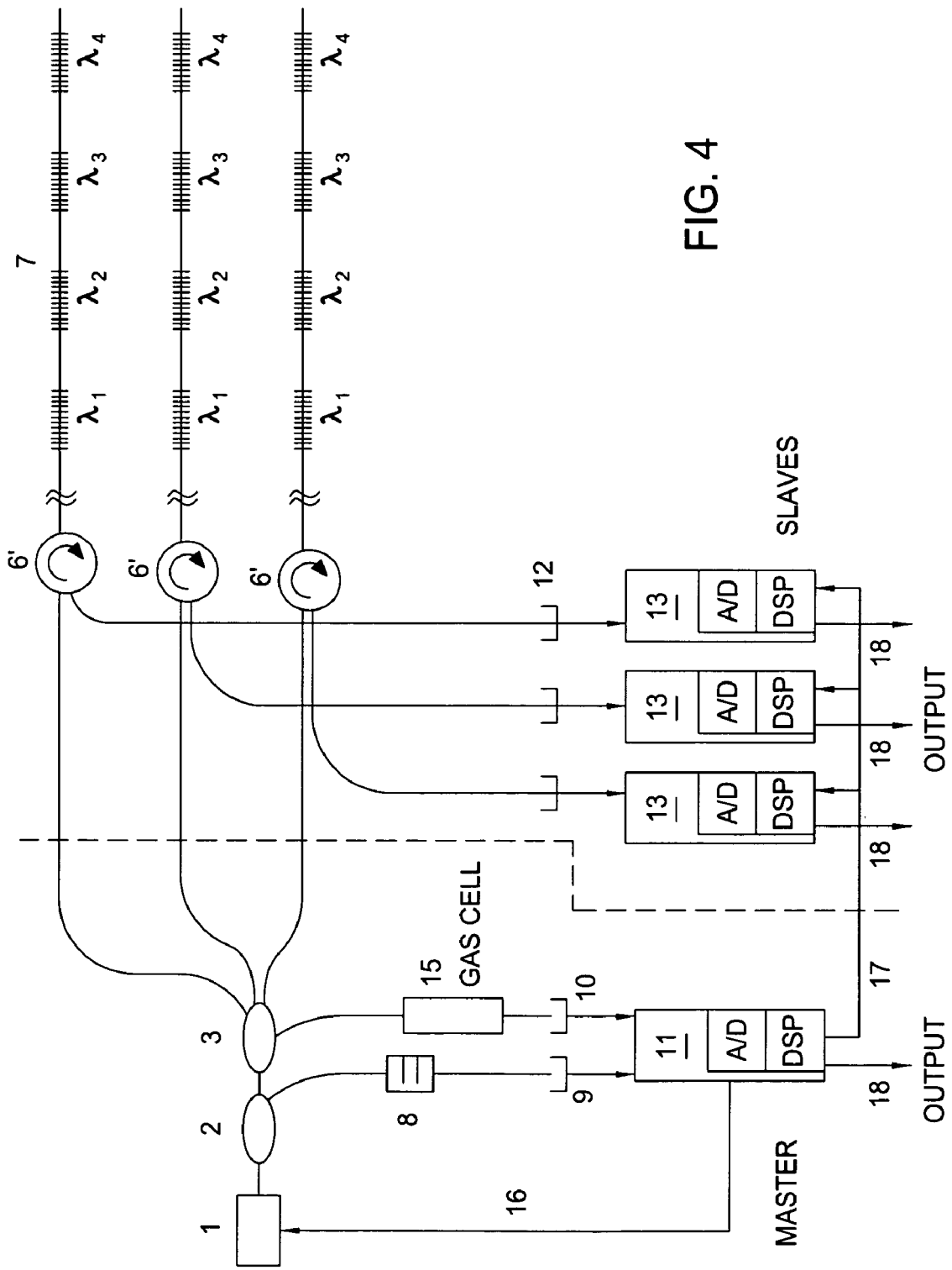
FIG. 4 illustrates an embodiment of a Master-Slave interrogator including a gas cell reference and circulators in the Slave unit.

FIG. 4 illustrates another alternative embodiment of a wavelength readout system in which some light from an optical source 1 is split off by a coupler 3 and then passed through a gas absorption cell 15. The part of the light which is not absorbed in the gas passes on to a reference detector 10 of the Master.

Figure 5:
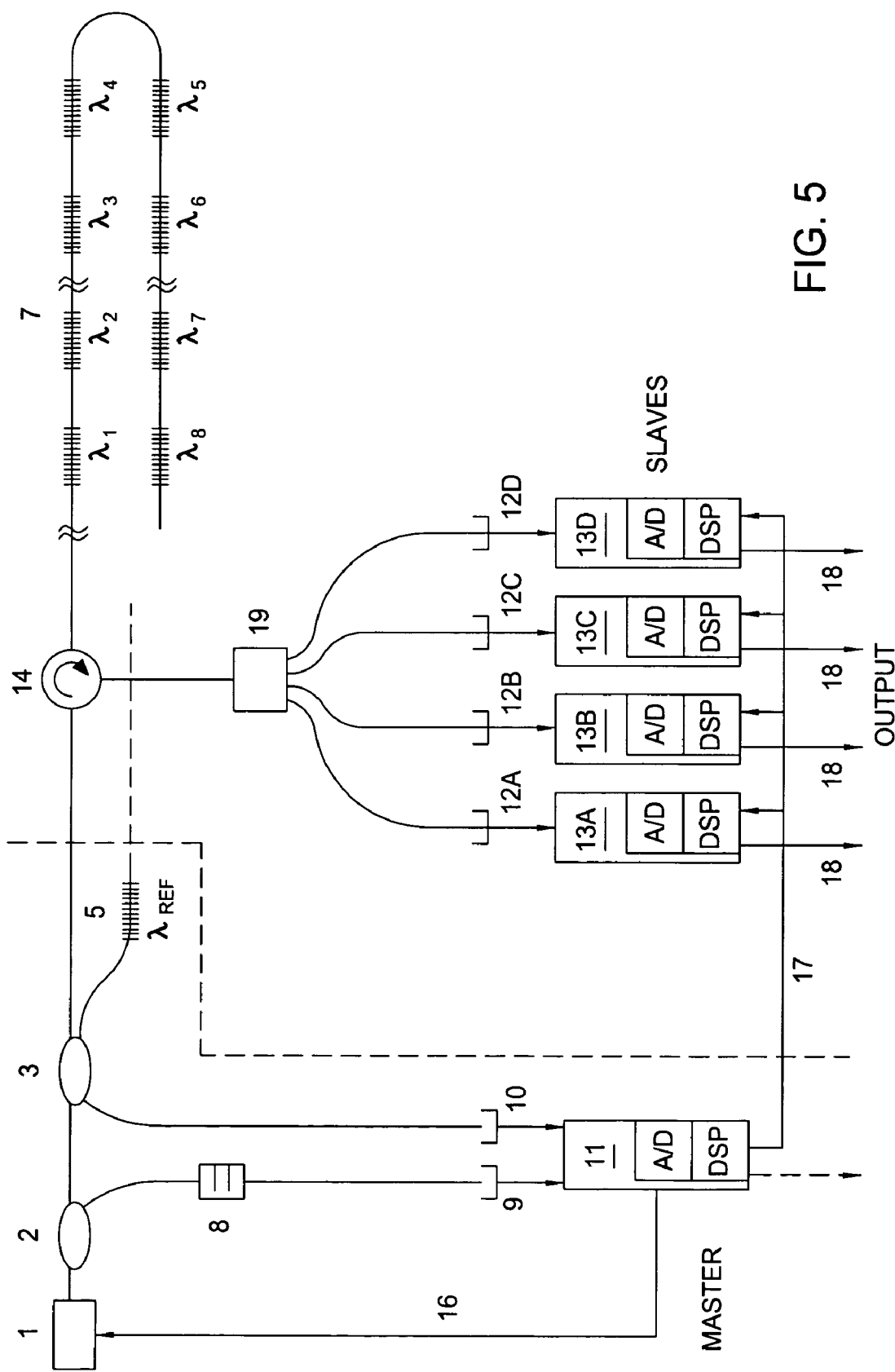
FIG. 5 illustrates an embodiment of a Master-Slave interrogator where a multiple of slave detection and processing units having different sensitivities are coupled to one string of sensors with a large variation in the reflected sensor signals. A reference grating is shown, but other reference techniques can be used.

In the embodiment of the invention shown in FIG. 5 a part of the wavelength swept light is passed to the reference system of a Master, while a second part is passed though an optical circulator 14 to a string of FBG sensors/elements 7, which is a single string with no splitting of the light into additional strings. The reflected signals from the string of FBG sensors/elements 7 are passed through the circulator 14 and divided by a splitter 19 between several receivers 12A, 12B, 12C, 12D, one for each slave processing unit 13A, 13B, 13C, 13D. The receivers 12A, 12B, 12C, 12D have different sensitivities optimized for different signal amplitudes. Since all the signals go to all the receivers 12A, 12B, 12C, 12D, the digital signal processing units 13A, 13B, 13C, 13D are set to process only signals within the dynamic range of the receiver. The splitter 19 can have unequal splitting ratio to optimize the signal-to-noise ratio at each receiver 12A, 12B, 12C, 12D. Alternatively, the splitter 19 can be replaced by a coarse wavelength de-multiplexer, which splits the reflected signals into different wavelength bands. In this way, each of the receivers 12A, 12B, 12C, 12D can have a sensitivity which is adjusted to detect signals of amplitudes as for the reflected signals from a group of sensors in the corresponding wavelength band, and filtered by the de-multiplexer to the appropriate receiver 12A, 12B, 12C, 12D.

The Slave part of the system can in one alternative version of the optical wavelength interrogation system be duplicated by placing a circulator in the second output port of the 3 dB coupler 4 in FIG. 2 (containing the reference FBG 5).

A first advantageous result obtained with this invention is the simultaneous interrogation of FBG sensor arrays covering the same wavelength range along several fibers using only one wavelength swept source and one wavelength reference system, which will reduce the cost of the system and cost per sensor point. A second advantage of the invention is that it provides an available wavelength band for FBG sensors unaffected by the reference system by having Slave modules without reference FBGs. A third advantage of the invention is that it provides increased dynamic range of the measurement system by coupling the reflected signals from FBG sensors along one or more fibers to separate Slave modules with receiver sensitivity optimized to cover different signal amplitude ranges.

While the foregoing is directed to embodiments of the present invention, other and further embodiments of the invention may be devised without departing from the basic scope thereof, and the scope thereof is determined by the claims that follow.

What is claimed is:

1. An optical wavelength readout system for application in optical sensing systems, comprising:
 a master unit, comprising:
  a wavelength swept optical source for launching light into a string of optical sensors;
  a master detection and processing unit for detecting and processing the light emitted by the source; and
  a wavelength reference unit adapted to make a reference signal available to other parts of the readout system, wherein the reference signal represents a generally exact relation between the wavelength of the light emitted from the source and time; and a slave unit having a light coupling device for coupling light from the optical source into the string of optical sensors and for coupling light reflected from the string of optical sensors to a slave detection and processing unit arranged to detect and process the reflected light, wherein light passing through the wavelength reference unit is directed to the master detecting and processing unit while being isolated from the slave detection and processing unit.

2. The optical wavelength readout system of claim 1, wherein the reference signal comprises information on the intensity of light emitted by the optical source.

3. The optical wavelength readout system of claim 1, further comprising a control signal output for controlling the light source.

4. The optical wavelength readout system of claim 3, wherein the control signal output is provided as an output from the master unit.

5. The optical wavelength readout system of claim 3, wherein the control signal output is provided as an output from the slave unit.

6. The optical wavelength readout system of claim 1, wherein the reference signal is provided as an electrical output from the master detection and processing unit.

7. The optical wavelength readout system of claim 6, wherein the electrical output is coupled to an electrical signal transfer between the master detection and processing unit and the optical source.

8. The optical wavelength readout system of claim 6, wherein the electrical output is coupled to an electrical signal transfer between the master detection and processing unit and the slave detection and processing unit.

9. The optical wavelength readout system of claim 1, wherein the slave detection and processing unit comprises a detector, an electrical amplifier and an electrical filter.

10. The optical wavelength readout system of claim 1, wherein the master unit comprises a master information signal output for providing information about the wavelength and amplitudes of the reference signal to external devices.

11. The optical wavelength readout system of claim 1, wherein the slave unit comprises a slave information signal output for providing to external devices information about the wavelengths and amplitudes of sensor reflected signals.

12. The optical wavelength readout system of claim 1, further comprising a feedback arrangement for coupling the reference signal to the source such that the master detection and processing unit and the feedback arrangement operates as a feedback control system for the source.

13. The optical wavelength readout system of claim 1, wherein the wavelength swept optical source includes an optical broadband source in combination with an optical wavelength swept optical filter.

14. The optical wavelength readout system of claim 1, wherein the wavelength swept optical source includes a wavelength swept laser source.

15. The optical wavelength readout system of claim 1, further comprising an optical coupler arranged to couple a first part of the light from the optical source to a string of fiber Bragg grating (FBG) elements and to couple light reflected from the FBG elements to a detector.

16. The optical wavelength readout system of claim 1, further comprising an optical coupler arranged to couple a part of the light from the optical source to the master unit.

17. The optical wavelength readout system of claim 1, wherein the wavelength reference unit comprises at least one reference element selected from a group of reference elements consisting of a reference fiber Bragg grating, an etalon and a gas absorption cell.

18. The optical wavelength readout system of claim 1, further comprising an optical circulator arranged to couple light from the optical source to at least one FBG sensor and to couple light reflected from the at least one FBG sensor to a detector, thereby reducing coupling losses in the system.

19. The optical wavelength readout system of claim 1, wherein the slave detection and processing unit is adapted to determine a wavelength peak in the spectrum of the detected signal reflected from the FBG sensors and use the reference signal.

20. The optical wavelength readout system of claim 1, wherein the master unit and the slave unit each comprise an analog-to-digital (A/D) converter and a digital signal processor (DSP).

21. The optical wavelength readout system of claim 20, wherein the A/D-converter and DSP of the master detection and processing unit and those of the slave detection and processing unit are synchronized.

22. The optical wavelength readout system of claim 1, wherein a wavelength de-multiplexer is adapted to de-multiplex light in a wavelength range to the slave unit, the wavelength range including the reflection wavelengths of a corresponding group of FBGs.

23. The optical wavelength readout system of claim 18, wherein a wavelength de-multiplexer is adapted to de-multiplex light within a wavelength range, the wavelength range including the reflection wavelengths of a corresponding group of the FBGs.

24. The optical wavelength readout system of claim 1, further comprising multiple slave units, wherein slave detection and processing units of the slave units include optical receivers with fixed, but different sensitivities, optimized for different sensor signal strengths.

* * * * *